United States Patent [19]

Bucska et al.

[11] Patent Number: 4,626,933

[45] Date of Patent: Dec. 2, 1986

[54] METHOD AND APPARATUS FOR QUALIFYING DATA

[75] Inventors: Nicholas J. Bucska; James F. Hopper, both of Louisville, Colo.

[73] Assignee: Amcodyne Incorporated, Longmont, Colo.

[21] Appl. No.: 524,426

[22] Filed: Aug. 18, 1983

[51] Int. Cl.[4] .......................... G11B 5/02; G11B 5/09
[52] U.S. Cl. ...................................... 360/51; 360/46; 360/51; 360/53
[58] Field of Search .................. 360/51, 39, 46, 53, 360/55, 67

[56] References Cited

U.S. PATENT DOCUMENTS

| | | | |
|---|---|---|---|
| 3,631,263 | 12/1971 | Graham et al. | 307/231 |
| 3,689,903 | 9/1972 | Agrawala et al. | 360/51 |
| 3,711,843 | 1/1973 | Galvagni | 360/51 X |
| 3,846,829 | 11/1974 | Lin | 360/46 |
| 4,074,325 | 2/1978 | Sakai et al. | 360/39 |
| 4,081,756 | 3/1978 | Price et al. | 360/53 X |
| 4,219,152 | 8/1980 | Couch et al. | 360/40 |
| 4,346,411 | 8/1982 | Buhler et al. | 360/67 X |
| 4,346,412 | 8/1982 | Conley | 360/46 |
| 4,385,328 | 5/1983 | Tanaka | 360/67 X |
| 4,399,474 | 8/1983 | Coleman, Jr. | 360/67 X |
| 4,480,276 | 10/1984 | Batey et al. | 360/46 |
| 4,495,529 | 1/1985 | Gustafson | 360/46 |

FOREIGN PATENT DOCUMENTS 54-11708  1/1979  Japan ..................... 360/46

Primary Examiner—Raymond F. Cardillo
Assistant Examiner—Alyssa H. Bowler
Attorney, Agent, or Firm—Sheridan, Ross & McIntosh

[57] ABSTRACT

An apparatus is provided for removing invalid read signal peaks which are detected during a disk read operation. In one embodiment, the apparatus converts the analog read-back signal from the disk into a pair of signals, a raw data signal being indicative of the signal peaks read from the disk and a raw polarity signal being indicative of the polarity of such peaks. The raw data signal is inputted to a phase lock loop, which outputs a strobe signal. The raw data signal and the raw polarity signal are made synchronous with the strobe signal in a reclocking circuit. The data and polarity signals outputted by the reclocking circuit are synchronously applied to a qualifying circuit, the output therefrom being free of invalid data.

6 Claims, 5 Drawing Figures

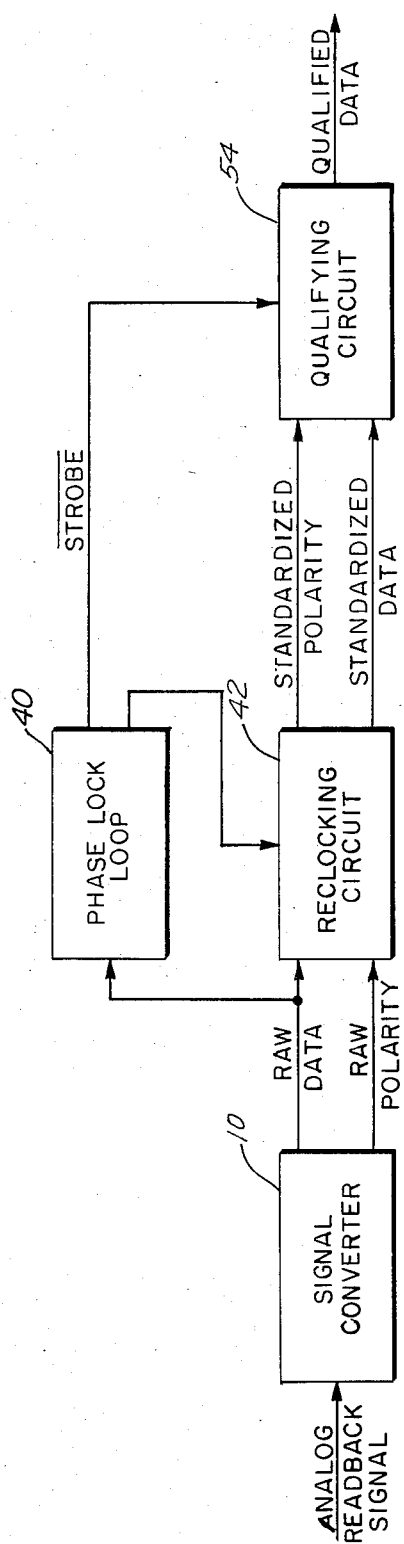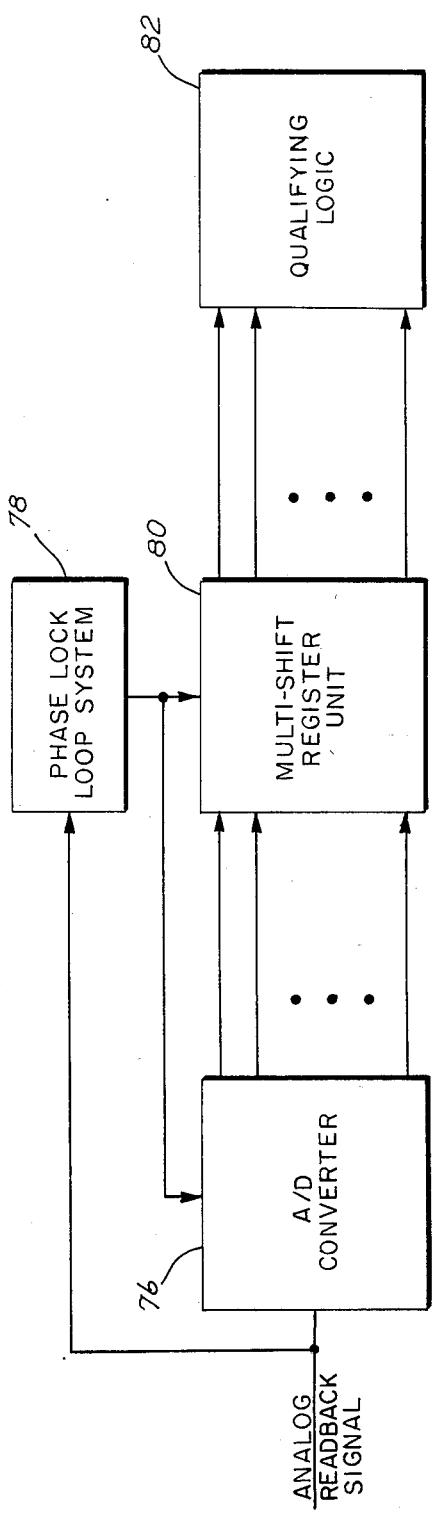

METHOD AND APPARATUS FOR QUALIFYING DATA

FIELD OF THE INVENTION

The present invention relates to a method and an apparatus for eliminating false or invalid read signal peaks so that only true or valid read signal peaks remain. The valid read signal peaks are stored on a magnetic disk and the invalid read signal peaks occur because of adjacent track interference, media defects, and electrical noise.

BACKGROUND INFORMATION

In reading data stored on a magnetic disk, a common but unwanted occurrence is the reading of invalid data signal peaks. Unless eliminated these signal peaks impair the accuracy of the data obtained from the disk. Since the data read is typically to be utilized in other parts of a digital system, it is imperative that the data be free of error. The present invention is directed to providing error-free data while minimizing hardware costs and the amount of hardware space required to implement the invention.

In U.S. Pat. No. 3,631,263 to Graham et al., an apparatus is disclosed for separating invalid data from valid data. The apparatus is configured to permit readout data to be outputted therefrom only if four conditions are satisfied. In determining whether these conditions are met, two signal channels are employed.

Unlike the Graham et al. apparatus, the present invention generates a strobe or clock signal which is synchronous with one or more unqualified or raw data signals. A data signal is "unqualified" in that invalid and unwanted signal pulses, due to adjacent track interference, media defects, and electrical noise, may be present. In one embodiment of the invention, read information is initially converted to a single unqualified data signal and a polarity signal, which provides information relating to the polarity of the single data signal. The strobe signal is synchronous with both the unqualified data signal and the polarity signal. Another important feature of the present invention is the use of a shift register for receiving a data signal having pulses corresponding to the peaks associated with the signal read from the disk.

DISCLOSURE OF THE INVENTION

In accordance with the present invention, an apparatus is provided for removing unwanted signal peaks detected during the read operation using a magnetic disk. In one embodiment, the apparatus includes a signal converter for converting the analog readback signal from the disk into two separate but related signals. A Raw Data signal is generated, which represents the signal peaks read from the disk; and, a Raw Polarity signal is generated, which represents the polarity of the signal peaks read from the disk. The Raw Data signal is inputted to a phase lock loop for measuring the average phase of the signal inputted thereto and outputting a signal that is locked to the average phase of the data. The Raw Data signal is also applied, together with the Raw Polarity signal, to a reclocking circuit. Basically, the reclocking circuit outputs a Standarized Polarity signal and a Standardized Data signal which are synchronized with a Strobe or Clock signal so that the transition or edge of a standardized data pulse and a standardized polarity pulse occur at a constant time interval with respect to a Strobe signal transition. The Standardized Data and Standardized Polarity signals are then sent to a qualifying circuit, including logic circuitry based upon a predetermined algorithm, for removing invalid standardized read data and outputting qualified data, which represents only valid or true read signal peaks.

In conjunction with the hardware just described, a number of advantages are achieved. A relatively inexpensive and simplified circuit is provided for removing invalid read signal peaks detected during a disk read operation. Such an apparatus is easily integrated with conventional circuitry and the amount of space required for implementation of the hardware on a PC board is minimized. The circuit of the present invention dissipates relatively less power and accuracy of the read data is enhanced. Additionally, temperature variations do not result in any noticeable effect on circuit operation and the effect of noise is reduced.

Additional advantages of the present invention will become readily apparent from the following discussion, taken in conjunction with the accompanying drawings.

BRIEF DESCRIPTION OF THE DRAWINGS

FIG. 1 is a block diagram of the present invention;

FIG. 5 is a block diagram of another embodiment of the present invention.

DETAILED DESCRIPTION OF PREFERRED EMBODIMENTS

Figure 2:
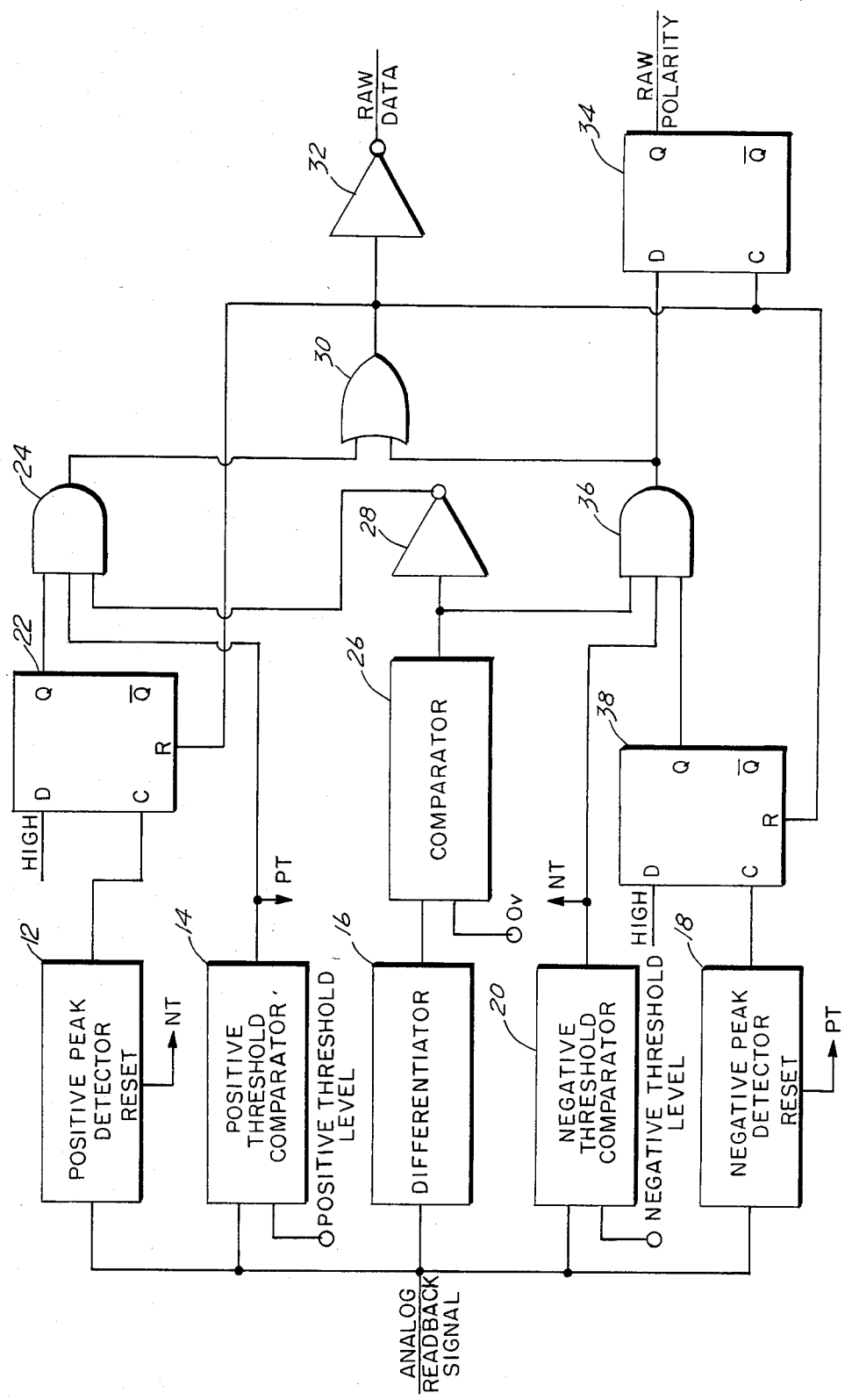
FIG. 2 is a schematic illustration of the signal converter of the present invention.

Referring to FIGS. 1–4, the hardware components of an embodiment of the present invention are illustrated and the following discussion is directed thereto. In FIG. 1, an Analog Readback or Read signal is shown being inputted to a signal converter 10. The Analog Readback signal is generated by a head or transducer which reads information previously written or stored on a magnetic disk. Signal converter 10 is illustrated in more detail in FIG. 2. The Analog Readback signal is applied to a number of parallel signal paths in the signal converter 10. The signal is inputted to a positive peak detector 12, a positive threshold comparator 14, a differentiator 16, a negative peak detector 18, and a negative threshold comparator 20.

The positive peak detector 12 outputs a positive level signal or logic HIGH when the analog input applied thereto is of a positive magnitude or begins to exceed zero volts. In one embodiment, the positive peak detector 12 includes a sample and hold circuit, comprising a transistor and a capacitor connected to the emitter of the transistor. The capacitor charges very rapidly to the magnitude of any positive analog voltage signal applied to the base of the transistor. The output of the positive peak detector 12 is sent to the clock input of a D-type flip-flop 22, the D-input is continuously provided with a logic HIGH.

The positive threshold comparator 14 compares the Analog Readback signal with a predetermined positive threshold level. The predetermined level is some fraction or percentage of expected read signal peaks, which are indicative of data information read from the disk. Typically, the threshold level is in the range of 30–50% of the expected peak value. The positive threshold comparator 14 outputs a logic HIGH when the magnitude of the inputted Analog Readback signal is greater than the positive threshold level inputted thereto. Conversely, when the Analog Readback signal is less than the positive threshold level, a logic LOW is outputted by the positive threshold comparator 14. The output of the positive threshold comparator 14 is sent to AND gate 24. The Q output of flip-flop 22 is also applied to AND gate 24.

The differentiator 16 differentiates or provides a derivative output of the inputted analog readback signal and the derivative signal is sent to a comparator 26. Also inputted to comparator 26 is a predetermined voltage level so that the output of the comparator 26 provides an indication of zero crossings of the Analog Readback signal. In particular, the predetermined level is at zero volts and when the derivative Analog Readback signal crosses zero, the output of comparator 26 changes. In the case of the derivative signal changing from a positive level to a negative level, the output of the comparator 26 provides a transition from a logic HIGH to a logic LOW. Similarly, when the derivative signal changes from a negative level to a positive level, the output of the comparator 26 provides a transition from a logic LOW to a logic HIGH. The output of the comparator 26 is also applied to the AND gate 24 through an inverter 28.

The output of the AND gate 24 communicates with OR gate 30 and the output of the OR gate 30 is applied to an inverter 32. The output of OR gate 30 is also directed to the reset input of the flip-flop 22. The output of the inverter 32 is a digital signal identified as Raw Data having pulses indicative of valid or true data information detected from the disk during the read operation. Commonly, this output also includes pulses representative of invalid or false read peaks which are generated during the read operation and are the result of interference between tracks on the disk, defects on the disk, and electrical noise.

In addition to outputting a digital signal representing raw data, the signal converter 10 also outputs a digital signal identified as Raw Polarity. This signal is also obtained using the Analog Readback signal and is representative of the polarity of the peaks of the Analog Readback signal. The Raw Polarity signal is outputted by a D-type flip-flop 34, which is clocked by the output of the OR gate 30. The D-input of the flip-flop 34 is responsive to the output of AND gate 36. One of the three inputs to the AND gate 36 is provided by the comparator 26. In the case of a logic HIGH to logic LOW transition outputted by the comparator 26, the input to AND gate 36 is a logic LOW so that the raw polarity output is a logic LOW, when the flip-flop 34 is clocked by the output of the OR gate 30.

When a negative going data peak is applied to the signal converter 10, the negative threshold comparator 20 and the negative peak detector 18 are utilized, together with D-type flip-flop 38 and AND gate 36. The output of AND gate 36 is also coupled to OR gate 30 so that the raw data output of Inverter 32 includes a digital representation of both positive and negative analog readback peaks. The output of the negative threshold comparator 20 also functions to discharge the capacitor of the positive peak detector 12, when the negative going peak is detected, by providing a discharge path for the capacitor. Likewise, the output of the positive threshold comparator 14 functions to discharge the capacitor of the negative peak detector 18, when the positive peak is detected, by providing a discharge path for that capacitor.

Figure 3:
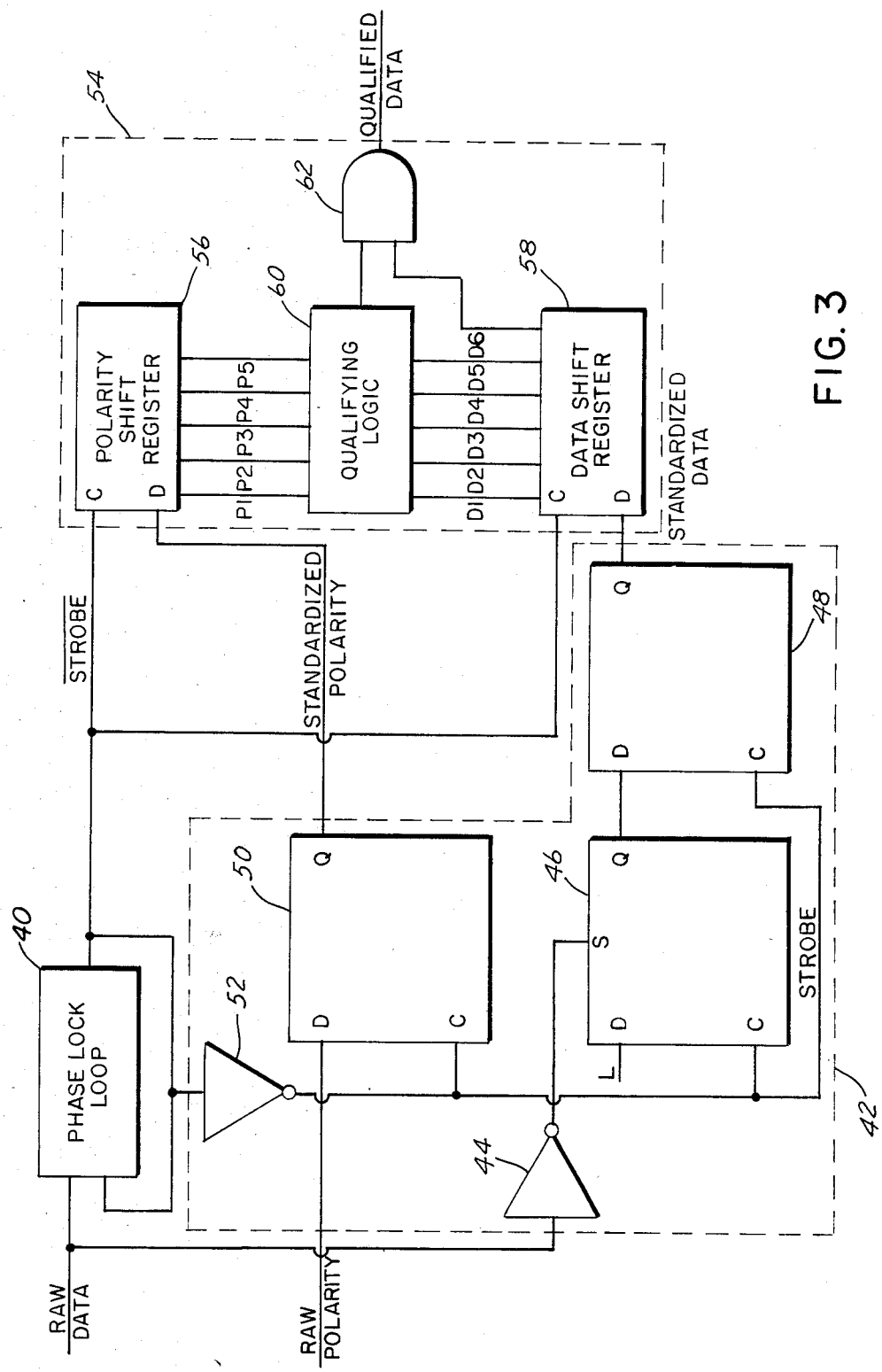
FIG. 3 is a schematic illustration of the phase lock loop, reclocking circuit, and qualifying circuit of the present invention.

With reference now to FIG. 3, as well as FIG. 1, the Raw Data signal is inputted to both a phase lock loop 40 and a reclocking circuit 42. The Raw Polarity signal is also inputted to the reclocking circuit 42. The phase lock loop 40 acts to determine the average phase of the Raw Data signal and outputs a $\overline{\text{Strobe}}$ signal that is locked to the average phase of the Raw Data signal and each raw data pulse represents the occurrence of a peak in the analog readback signal.

The reclocking circuit 42 includes an Inverter 44 for inverting the Raw Data signal, the output of the Inverter 44 communicating with the set input of the D-type flip-flop 46. The output of the flip-flop 46 is sent to the D-input of the D-type flip-flop 48, the Q output of which represents a standardized data signal.

The reclocking circuit 42 further includes a D-type flip-flop 50, the D-input thereof communicating with the raw polarity signal. The Q output of the flip-flop 50 provides a standardized polarity signal. The flip-flops 46 and 50 being clocked by a Strobe signal after the $\overline{\text{Strobe}}$ signal is inverted by Inverter 52.

Basically, the reclocking circuit 42 outputs a standardized polarity signal. Both of these signals are synchronized with the $\overline{\text{Strobe}}$ signal. That is, transitions of the standardized signals, or the pulse edges thereof, occur at constant time intervals with respect to transitions of the $\overline{\text{Strobe}}$ signal.

The standardized polarity and standardized data signals are next applied to a qualifying circuit 54, which includes a polarity shift register 56, a data shift register 58, qualifying logic 60, and an AND gate 62. The standardized polarity signal communicates with the D-input of the polarity shift register 56 while the standardized data signal communicates with the D-input of the data shift register 58. The standardized data pulses, representing valid read signal peaks as well as unwanted invalid signal peaks, and the standardized polarity pulses representing the polarity of each of such peaks, are clocked into their respective shift registers 56, 58 by the $\overline{\text{Strobe}}$ signal.

In one embodiment of the present invention, the polarity shift register 56 comprises five bits and the data shift register 58 comprises six bits. Each of the five bits in the polarity shift register 56 is inputted to the qualifying logic 60 while only the first five bits of the six bit data shift register 58 are inputted to the qualifying logic 60. The qualifying logic 60 is an implementation of an algorithm for use in determining whether the peak or data pulses (standardized data) read from a magnetic disk are valid or invalid. Whenever bit D6 of the data shift register 58 becomes a logic HIGH, the state of the logic signal outputted by the qualifying logic 60 determines whether the presently outputted data pulse D6 is valid. Specifically, with reference to $\overline{\text{Strobe}}$ pulses, the validity of a selected data pulse is determined at the inputting of the sixth $\overline{\text{Strobe}}$ pulse from the time the selected data pulse was inputted to the data shift register 58. Accordingly, in the case in which the bit D6 is a logic HIGH and the qualifying logic 60 outputs a logic HIGH, the output of AND gate 62 is a logic HIGH indicating that a valid peak or valid data pulse is present.

With respect to the qualifying logic 60, the logic hardware thereof is a function of the encoding technique that the particular disk drive uses in association with the magnetic disk which is being read. In one embodiment, the qualifying logic 60 was formulated to handle 2,7 code and is known to those skilled in the art. An algorithm for the 2,7 code was devised for use in the present invention in determining the validity of peaks read from a magnetic disk. The algorithm incorporates the following factors:

1. Any peak followed by a peak within two $\overline{\text{Strobe}}$ periods is invalid and not qualified.
2. Any peak followed by a peak of the same polarity and occurring within six $\overline{\text{Strobe}}$ periods is invalid and not qualified.
3. A first peak, followed by a second peak occurring at a time greater than six $\overline{\text{Strobe}}$ periods from the first peak, is valid.
4. A first peak, followed by a second peak of opposite polarity occurring three to six clock periods from the first peak, is valid.

This algorithm can be expressed as follows in terms of bits outputted by the polarity shift register 56 and bits outputted by the data shift register 58 to the qualifying logic circuitry 60:

Logic output state of the qualifying logic
$$60 = \overline{D5} \cdot (\overline{D4} + D3) \cdot ((P3 \oplus P5) + \overline{D3}) \cdot ((P1 \oplus P4) + (\overline{D1} \cdot \overline{D2}) + D3).$$

The letter D in the above algorithm refers to the data peaks and the letter P refers to the polarity of such peaks. Each of the numbers associated with each letter refers to the position of such data and polarity information in the shift registers 56, 58, the bits being stored in the shift register upon receipt of $\overline{\text{Strobe}}$ pulses.

The term $(\overline{D4}+D3)$ of the algorithm is also provided to eliminate a problem which might occur due to early shifting of a peak. That is, because of the design of the reclocking circuit 42, it is possible that a single read signal peak may cause two consecutive standardized data pulses to be generated. In the event that a read signal peak is followed by another peak three strobe or clock periods away and wherein the following peak is shifted early so that two consecutive standardized data pulses are produced, the first of the two consecutive pulses will not result in an invalid data determination since the term $(\overline{D4}+D3)$ will enable a logic HIGH to be outputted by the qualifying logic 60 in such a case.

It should be appreciated that other algorithms can be formulated for qualifying the standardized data and such an algorithm depends upon the type of data encoding on the disk and the number of bits in the shift registers 56, 58. It should also be understood that the number of bits in the shift registers 56, 58 can vary. On the one hand, the greater the number of shift register bits, generally speaking, increased accuracy in qualifying data is attained. On the other hand, the number of shift register bits may be so great as to create a problem relating to read to write turn-around time. If the shift register is too long, the disk controller may not have sufficient time to perform the data qualifying operations during the time the head is correctly positioned relative to the surface of the disk in order to write data on the disk.

OPERATION

Figure 4:
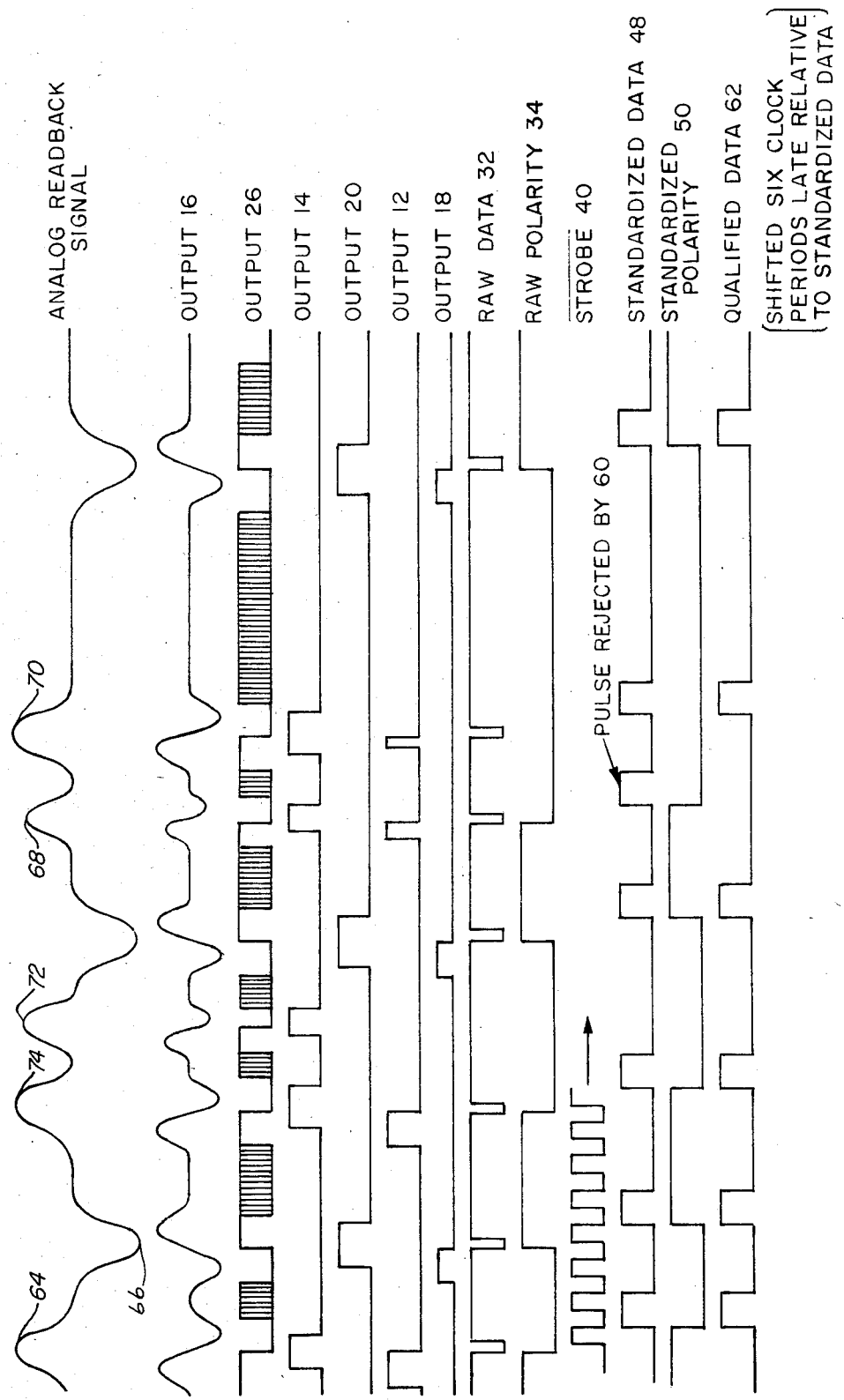
FIG. 4 is a timing diagram relating to the operation of the present invention.

The operation of the embodiment just described is next addressed. Frequent reference will be made to the timing diagram of FIG. 4 to assist in the understanding of the invention. In typical operation, a head or transducer is positioned relative to a disk surface and outputs the analog readback signal. As seen in FIG. 4, this signal includes a number of positive and negative peaks. Depending on how the data is encoded on the disk, as previously noted, the algorithm implemented using the qualifying logic 60 determines whether a particular peak is valid or invalid data. To prepare the analog readback signal for the qualifying logic 60, this signal is first inputted into the positive peak detector 12, positive threshold comparator 14, differentiator 16, negative peak detector 18, and negative threshold comparator 20. In the case of a positive peak 64 being applied, as represented in FIG. 4, the output of the positive peak detector 12 becomes a logic HIGH because of the positive going peak received. Similarly, the output of the positive threshold comparator 14 becomes a logic HIGH since the positive going analog readback signal, before the peak 64 was reached, exceeded the predetermined positive threshold level. The output of positive peak detector 12 clocks the logic HIGH on the D-input of flip-flop 22 to the Q output thereof and this logic HIGH is applied to AND gate 24. The logic HIGH output of positive threshold comparator 14 is also sent to AND gate 24. Meanwhile, the output of differentiator 16 crosses zero at the occurrence of peak 64 and the comparator 26 changes state from a logic HIGH to a logic LOW, as illustrated in the timing diagram. This newly produced logic LOW is inverted by inverter 28 so that a logic HIGH is sent to AND gate 24. Because each of the three inputs to AND gate 24 is a logic HIGH, AND gate 24 outputs a logic HIGH. This logic HIGH is sent to OR gate 30 which outputs a logic HIGH to Inverter 32 which outputs a logic LOW, this logic LOW being illustrated in the timing diagram. The duration or width of the logic LOW is determined by the time taken to reset flip-flop 22 using the output of OR gate 30. The output of inverter 32 represents the raw data portion of the two signals generated from the analog readback signal. The Q output of the flip-flop 34 represents the raw polarity portion. The raw polarity signal is also illustrated in FIG. 4 and is generated using the output from comparator 26 applied to AND gate 36. In the case of peak 64, the output of the comparator 26 is a logic LOW so that the output from the AND gate 36 and the input to the D-input of flip-flop 34 is a logic LOW. When the output of OR gate 30 becomes a logic HIGH due to peak 64, the logic LOW D-input is clocked to the Q output of flip-flop 34. As can be seen then, a positive peak produces a logic LOW polarity level.

During the time the positive going peak 64 results in a negative raw data pulse and a negative raw polarity level, the positive threshold comparator 14 is resetting the negative peak detector 18 to a logic LOW output. Also, the negative threshold comparator 18 outputs a logic LOW since the negative threshold level is not met by the positive peak 64. The clock input to flip-flop 38 is therefore a logic LOW and the Q output of flip-flop 38 remains a logic LOW, having been previously reset by the output of OR gate 30.

In the case of a negative going peak, such as peak 66, of the Analog Readback signal, each of the input to AND gate 36 becomes a logic HIGH. The output of the comparator 26 changes from a logic LOW to a logic HIGH. The output of the comparator 26 becomes a logic HIGH since the negative peak reaches a magnitude greater than the negative threshold level, and the negative peak detector 18 becomes a logic HIGH to clock the logic HIGH D-input to the Q output of flip-flop 38. Accordingly, the Inverter 32 outputs a logic LOW and the Q output of flip-flop 34 provides a logic HIGH, when the output of OR gate 30 clocks the logic HIGH present at the output of the AND gate 36.

With reference to FIG. 3, the Raw Data signal is sent to the phase lock loop 40 and Inverter 44 while the Raw Polarity signal is sent to the D-input of flip-flop 50. The raw data pulses, indicative of the presence of positive or negative peaks, are phase locked to the $\overline{\text{Strobe}}$ signal. Both the $\overline{\text{Strobe}}$ signal and Raw Data signal are inverted and then applied to the reclocking circuit 42.

With regard to the generation of the Standardized Polarity signal, the Q output of the flip-flop 50 provides an output signal, the state of which depends upon the polarity of the data peak. In the case of a logic LOW raw polarity pulse, indicating a positive peak, the Q output of flip-flop 50 becomes a logic LOW when a positive going clock input is provided thereto by Inverter 52. This is illustrated in the timing diagram. In the case of a logic HIGH raw polarity pulse, indicating a negative peak, the Q output of flip-flop 50 becomes a logic HIGH when a positive going clock input is provided thereto by Inverter 52.

With regard to the generation of the standardized data signal, a readback signal peak is represented by a logic HIGH pulse at the output of the inverter 44. This logic HIGH sets the Q output of the flip-flop 46 to a logic HIGH. The Q output of flip-flop 46 is sent to the D-input of the flip-flop 48. Consequently, when the Strobe pulse to the clock input of the flip-flop 48 has a positive going transition, the Q output of the flip-flop 48 (Standardized Data signal) becomes a logic HIGH. Closely following in time this sequence of events, the Q output of the flip-flop 46 changes to a logic LOW because the Strobe input to flip-flop 46 clocks the logic LOW D-input to the Q output. However, as can be seen from the timing diagram, this occurs only after the clocking of the flip-flop 48. The interaction and timing pertinent to flip-flops 46, 48, 50 is also illustrated by the timing diagram of FIG. 4.

As previously discussed, the Standardized Polarity signal, Standardized Data signal, and $\overline{\text{Strobe}}$ signal are now synced together for inputting to the shift registers 56, 58. A positive going transition of the $\overline{\text{Strobe}}$ signal clocks a standardized data pulse to the data shift register 58. Similarly, a standardized polarity pulse is inputted to the polarity shift register 56 using the $\overline{\text{Strobe}}$ signal as a clock. The output bits of each shift register 56, 58 are applied to the qualifying logic 60. In the embodiment discussed herein, a standarized data pulse is not qualified, or a determination is not made as to whether the data pulse is valid or invalid, until the occurrence of six strobe cycles. At that time, the state of the Standardized Data signal, inputted to the data shift register 58 during the first of six consecutive Strobe cycles, is applied to AND gate 62. In the event that the output of the qualifying logic 60 is a logic HIGH, the output of AND gate 62 is a logic HIGH indicating that a valid pulse was read from the disk. In making its determination, the qualifying logic 60 uses the states of the Standardized Data signal and the Standardized Polarity signal, which occurred during each of five consecutive Strobe cycles.

With reference to the analog readback signal of FIG. 4, a peak 68 generates a standardized data pulse. However, the algorithm determines that the peak 68 is followed by a peak 70 of the same polarity within six clock or $\overline{\text{Strobe}}$ periods of peak 68. The standardized data pulse, corresponding to the peak 68, is found to be invalid by the algorithm. AND gate 62 is not enabled so that the output therefrom remains a logic LOW thereby removing this invalid pulse from the pulse train.

With further reference to FIG. 4 and also FIG. 2, certain invalid peaks can also be removed using the positive peak detector 12. Specifically, in the case of an invalid peak 72, which is less in magnitude than the valid peak 74 of the same polarity, the capacitor of the positive peak detector 12 has not discharged appreciably from the time the valid peak 74 occurred. Since the capacitor remains in its charged state, another clock pulse is not generated and inputted to the flip-flop 22 when the second peak 72 is received. As a consequence, a pulse representing the invalid peak 72 is not produced at the output of the flip-flop 22.

In another embodiment of the present invention, as illustrated in FIG. 5, the analog readback signal is not initially converted to a polarity signal and a data signal. Instead, the analog readback signal is applied to an A/D converter 76. A number of digital signals are outputted from the A/D converter 76. Each of the signals provides information relating to the analog readback signal and together represent the voltage magnitude of the Analog Readback signal currently being inputted to the A/D converter 76. The A/D converter 76 is enabled by a signal outputted by a phase lock loop system 78, which also receives the Analog Readback signal. As a result, similar to the previously discussed embodiment, digital signals are synced with a clock signal before a determination is made as to whether valid or invalid data is present. Each of the digital signals is inputted to a single shift register of a multi-shift register unit 80. The clocking of the input signal to the shift register unit 80 is provided by the output signal from the phase lock loop system 78. As in the previous embodiment, qualifying logic 82 receives the outputs of the shift register unit 80 for use in determining whether analog readback signal peaks are valid. As is readily understood, the algorithm implemented in the qualifier logic circuitry 82 depends upon the number of digital signals generated. In operation, the information provided by each of the digital signals is utilized to determine whether a valid peak is present. This is accomplished by the devised algorithm as implemented by the qualifying logic 82.

Based on the foregoing detailed description, a number of advantages of the described apparatus are readily discerned. The present invention provides an efficient yet easily implemented method and apparatus for eliminating false data read from a disk. The circuitry employed is relatively less expensive to implement. The space required on a PC board for the circuitry of the present invention is noticeably reduced. Further, the present invention dissipates less power during opera- tion, provides for increased accuracy in qualifying data, and is devised to reduce noise problems and temperature variation problems that can occur in qualifying data obtained from a disk.

Although the present invention has been described with reference to particular embodiments, it is readily appreciated that variations and modifications can be effected within the spirit and scope of this invention.

What is claimed is:

1. A method for use in removing invalid read data, comprising:

reading data from a storage medium, said data being represented by an analog signal having peaks, said data including both valid and invalid information;

providing a first predetermined threshold level relating to a first polarity;

providing a second predetermined threshold level relating to a second polarity;

determining that the analog signal has exceeded said first predetermined threshold level;

determining that the analog signal has exceeded said second predetermined threshold level, the period between the determination of the exceeding of the first predetermined threshold level and the second predetermined threshold level defining an interval;

updating substantially instantaneously in said interval a threshold value upon detection of the analog signal being greater than a current value of said threshold value;

continuing the updating of said threshold value in said interval to a value corresponding to a peak having a maximum signal value;

accepting as valid said peak having said first polarity and having said maximum signal value; and rejecting as invalid any peak occurring in said interval having said first polarity and having an amplitude which is not substantially equal to said maximum signal value.

2. A method, as claimed in claim 1, wherein:
said rejecting step includes generating a digital representation of an invalid peak and delaying rejection of said invalid peak using a digital representation of said invalid peak.

3. A method, as claimed in claim 2, wherein:
said rejecting step includes developing a digital representation of a number of peaks and using said plurality of said peaks in rejecting said invalid peak.

4. A method, as claimed in claim 1, wherein:
said accepting and rejecting steps include generating a digital representation of at least some of said peaks, said digital representation including a first digital signal indicative of only the polarity of said peak and a second signal indicative of only the time of occurrence of said peak.

5. An apparatus for removing invalid peaks from a read signal obtained from a magnetic storage medium, comprising:

first means for converting a plurality of analog peaks representing valid and invalid information to digital information, said digital information including a first signal representing only polarity information and a second signal representing only quantized timing information, each of said first and second signals associated with at least some of said peaks, said first means including sample/hold circuit means for tracking the signal value of at least one of said peaks, said sample/hold circuit means generating a threshold voltage corresponding to the maximum signal value of said read signal from the time said sample/hold circuit means was reset, said sample/hold circuit means also at the same time detecting the position of any peak greater than the instantaneous value of said threshold voltage; and second means responsive to said first means for rejecting the digital representation of at least one of said peaks when said one digitally represented peak represents invalid information.

6. An apparatus, as claimed in claim 5, wherein:
said second means includes combinatorial logic means having a plurality of inputs and at least one output, said combinatorial logic means for implementing a code dependent algorithm for removing at least one invalid peak.

* * * * *